(12) United States Patent
Yang et al.

(10) Patent No.: US 12,105,403 B2
(45) Date of Patent: Oct. 1, 2024

(54) CAMERA DEVICE CONNECTION STRUCTURE

(71) Applicant: JIASHAN D-MAX ELECTRONICS CO., LTD., Jiaxing (CN)

(72) Inventors: Ping-Huang Yang, Jiaxing (CN); Xin-Lian Cheng, Jiaxing (CN)

(73) Assignee: JIASHAN D-MAX ELECTRONICS CO., LTD., Taipei (TW)

( * ) Notice: Subject to any disclaimer, the term of this patent is extended or adjusted under 35 U.S.C. 154(b) by 96 days.

(21) Appl. No.: 17/959,318

(22) Filed: Oct. 4, 2022

(65) Prior Publication Data

US 2023/0314910 A1 Oct. 5, 2023

(30) Foreign Application Priority Data

Apr. 1, 2022 (TW) .................................. 111112891

(51) Int. Cl.
| | | |
|---|---|---|
| *G03B 17/12* | (2021.01) | |
| *H04N 23/51* | (2023.01) | |
| *H04N 23/55* | (2023.01) | |

(52) U.S. Cl.
CPC ............. *G03B 17/12* (2013.01); *H04N 23/51* (2023.01); *H04N 23/55* (2023.01)

(58) Field of Classification Search
CPC ......... G03B 17/02; G03B 17/12; H04N 23/55
See application file for complete search history.

(56) References Cited

FOREIGN PATENT DOCUMENTS

| | | | |
|---|---|---|---|
| CN | 211702154 U | 10/2020 | |
| JP | 2022096016 A | * 6/2022 | ........... G02B 27/646 |
| TW | M372012 U | 1/2010 | |
| WO | 2021136280 A1 | 7/2021 | |

OTHER PUBLICATIONS

Search Report dated Sep. 27, 2022 issued by Taiwan Intellectual Property Office for counterpart application No. 111112891.

* cited by examiner

*Primary Examiner* — Minh Q Phan
(74) *Attorney, Agent, or Firm* — Bradley J. Thorson; DeWitt LLP

(57) ABSTRACT

A camera device connection structure includes a circuit board, a lens assembly and a case assembly. The lens assembly is disposed on upper side of the circuit board and has a first mating section and a second mating section respectively disposed on two opposite sides of the lens assembly. The case assembly has a first case body and a second case body. The first and second case bodies are disposed on the upper side of the circuit board and respectively positioned on two sides of the lens assembly. The first and second case bodies respectively have a first connection section and a second connection section corresponding to the lens assembly. The first and second connection sections are respectively connected with the first and second mating sections of the lens assembly, whereby the structural strength of the camera device can be still enhanced in precondition that the camera device is thinned.

3 Claims, 2 Drawing Sheets

CAMERA DEVICE CONNECTION STRUCTURE

This application claims the priority benefit of Taiwan patent application number 111112891 filed on Apr. 1, 2022.

BACKGROUND OF THE INVENTION

1. Field of the Invention

The present invention relates generally to a camera device connection structure, and more particularly to a camera device connection structure, which can enhance structural strength of the camera device under the requirement for thinning the structure.

2. Description of the Related Art

A conventional electronic device (such as a cellular phone or a notebook) is equipped with a camera module disposed in the electronic device for taking pictures or filming. The camera module is a small-scale optical digital graphics transformation module formed of a combination of an optical lens and an image sensor (CCD or CMOS). The camera module is mainly composed of a lens, an image sensor, a printed circuit board (PCB) and left and right iron cases. When assembled, the image sensor soldered on the printed circuit board is first cleaned up. Then an automated adhesive-dispensing machine is used to dispense adhesive on the printed circuit board in a position between the left and right iron cases corresponding to the lens. Then the two sides of the lens disposed on the printed circuit board are respectively adhered and secured to the lateral sides of the left and right iron cases by means of adhesive. Thereafter, it is necessary to use a fixing jig to previously tightly press and locate the assembly. Then, the baking operation is performed to assemble the camera module.

However, there is a problem in the assembling process of the camera module. That is, when assembling and fixing the conventional camera module, multiple complicated steps are needed to complete the assembling process. In addition, in the assembling process, it is necessary to use an adhesive (such as UV adhesive) to adhere and secure the lens to the left and right iron cases and distinguish between the left and right iron cases. This leads to increase of production cost and enlarges the total volume of the structure. In the baking process, it is necessary to use the fixing jig to tightly press and locate the entire camera module. However, when tightly pressing and locating the camera module, the lens and the printed circuit board of the camera module continuously bear the downward pressing force of the fixing jig. This leads to increase of uncontrollable factors in the assembling and manufacturing process. In addition, some of the current camera modules are required to have narrowed bezel or be thinned. Therefore, in the baking process, when the fixing jig tightly presses the printed circuit board of the thinned camera module or the camera module with narrowed bezel, it is hard to control the pressing force. As a result, the printed circuit board is often seriously bent or damaged. This will affect the quality of the images and lead to unstable images. Therefore, after the conventional camera module is completely assembled, the structural strength of the entire camera module is obviously poor and the defect rate is increased and the quality of the product is deteriorated. All the above problems need to be solved.

SUMMARY OF THE INVENTION

It is therefore a primary object of the present invention to provide a camera device connection structure, which can enhance structural strength of the camera device.

It is a further object of the present invention to provide the above camera device connection structure, which can lower the cost and simplify the assembling steps and enhance the assembling efficiency.

It is still a further object of the present invention to provide the above camera device connection structure, which can increase production efficiency and facilitate the assembling process.

To achieve the above and other objects, the camera device connection structure of the present invention includes: a circuit board having an upper side and a lower side; a lens assembly disposed on the upper side of the circuit board, two opposite sides of the lens assembly respectively having a first mating section and a second mating section; and a case assembly having a first case body and a second case body. The first and second case bodies are disposed on the upper side of the circuit board and respectively positioned on two sides of the lens assembly. The first case body has a first connection section corresponding to the first mating section of the lens assembly. The second case body has a second connection section corresponding to the second mating section of the lens assembly. The first and second connection sections are connected with the first and second mating sections of the lens assembly.

By means of the design of the camera device connection structure of the present invention, the structural strength of the camera device can be still enhanced in precondition that the structure is thinned. Moreover, the cost is lowered and the assembling steps are simplified so that the production efficiency is increased. In addition, it is very conveniently to assemble the camera device.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
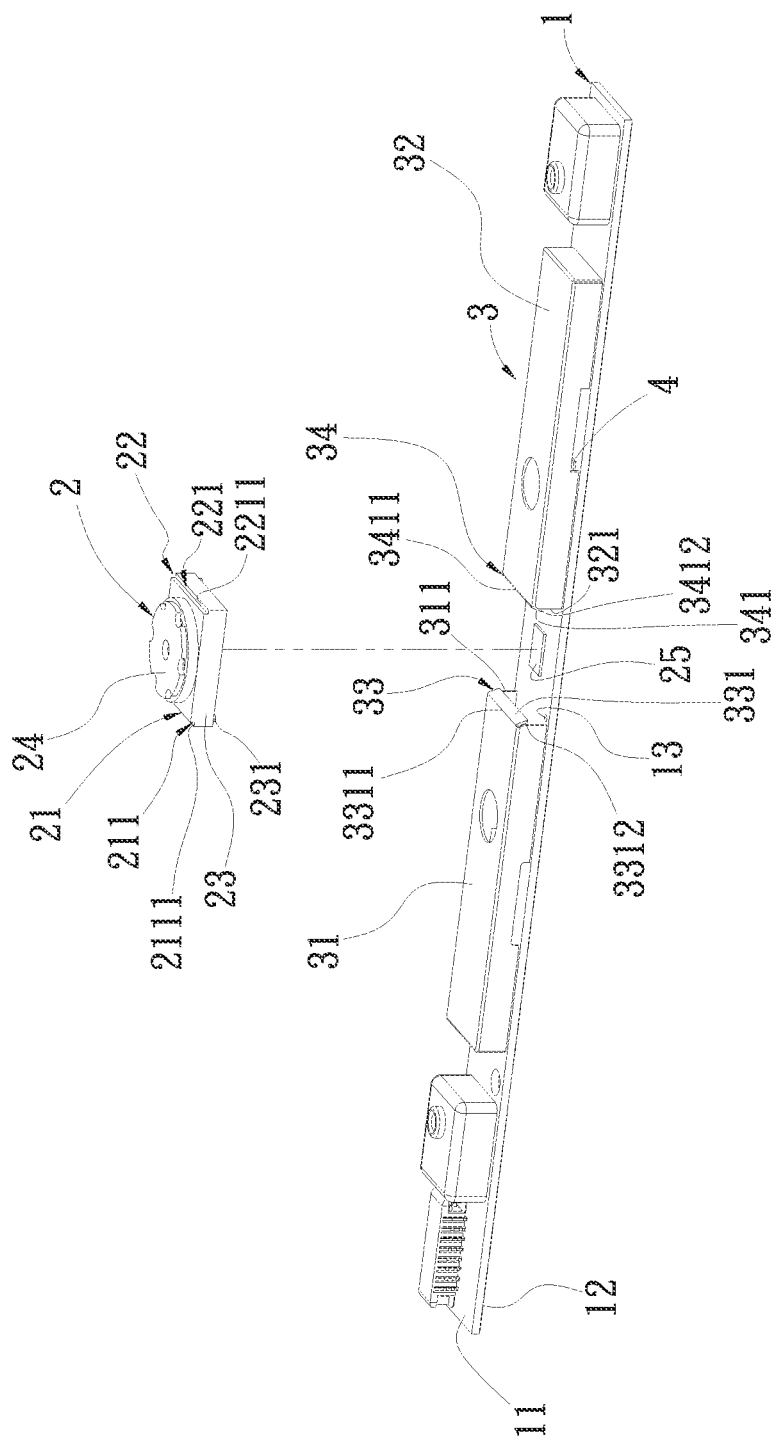
FIG. 1 is a perspective exploded view of a preferred embodiment of the present invention.
Figure 2:
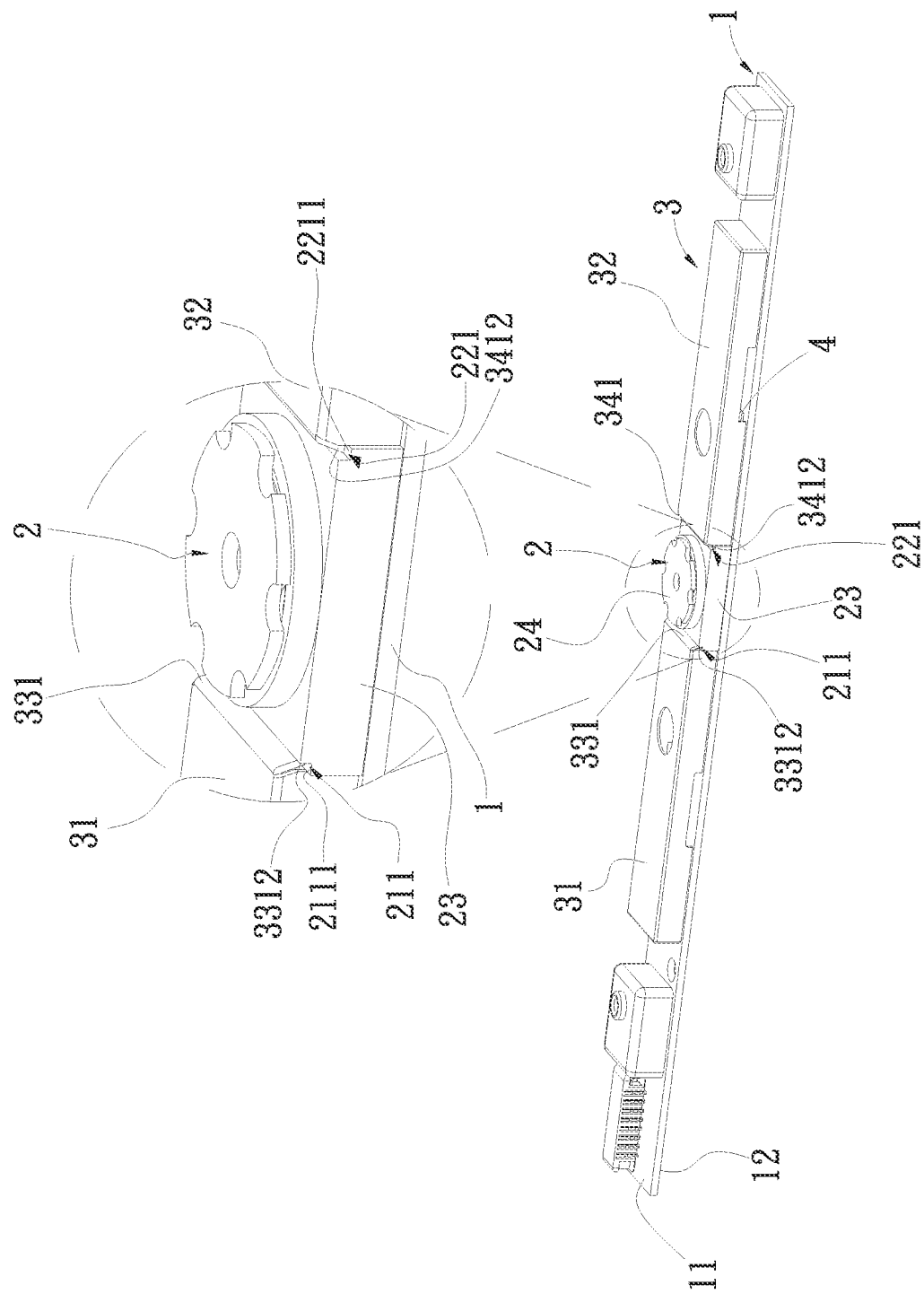
FIG. 2 is a perspective assembled view of the preferred embodiment of the present invention, in which a part of the present invention is enlarged.

Please refer to FIGS. 1 and 2. FIG. 1 is a perspective exploded view of a preferred embodiment of the present invention. FIG. 2 is a perspective assembled view of the preferred embodiment of the present invention, in which a part of the present invention is enlarged. As shown in FIGS. 1 and 2, the camera device connection structure of the present invention includes a circuit board 1, a lens assembly 2 and a case assembly 3. The circuit board 1 is a printed circuit board 1 (such as a flexible printed circuit board 1 or a rigid printed circuit board 1). The circuit board 1 has an upper side 11, a lower side 12 and multiple locating holes 13. The locating holes 13 pass through the circuit board 1 from the upper side 11 to the lower side 12.

The lens assembly 2 is disposed on the upper side 11 of the circuit board 1. The lens assembly 2 includes a first mating section 21, a second mating section 22 and a base seat 23. The first and second mating sections 21, 22 are respectively disposed on two opposite sides of the base seat 23 of the lens assembly 2. The first and second mating sections 21, 22 are respectively formed with a first notch 211 and a second notch 221. The first and second notches 211, 221 are in the form of stepped structures (or staged structures or channels) and are inward recessed from the two opposite sides of the base seat 23 to respectively form a first step face 2111 and a second step face 2211. Multiple leg sections 231 protrude from a bottom side of the base seat 23 and are connected in the locating holes 13 of the circuit board 1. Accordingly, the lens assembly 2 is securely located on the circuit board 1 and restricted from radially displacing (such as back and forth or left and right horizontally displacing).

Please further refer to FIG. 1. The lens assembly 2 further includes a lens 24 and an image sensor 25. The lens 24 is composed of multiple lenses and disposed on a top side of the base seat 23. The image sensor 25 is disposed on the upper side 11 of the circuit board 1 and electrically connected with the circuit board 1. The image sensor 25 is such as a charge-coupled device (CCD) image sensor or a complementary metal oxide semiconductor transistors (CMOS) image sensor. The image sensor 25 is encased in the base seat 23 and aligned with the lens 24 on the base seat 23. Via the lens 24, the image sensor 25 can capture the image of outer side and transform the image into an image signal. In practice, an optical filter can be additionally disposed between the image sensor 25 and the lens 24. Alternatively, an optical filter can be disposed in front of the lens 24.

The case assembly 3 has a first case body 31 and a second case body 32. The first and second case bodies 31, 32 are disposed on the upper side 11 of the circuit board 1 and respectively positioned on two sides of the base seat 23 of the lens assembly 2. In this embodiment, the first and second case bodies 31, 32 are made of metal material (such as aluminum, stainless steel, titanium, gold, copper, iron or alloy material of any combination of the aforesaid metal materials or other metal material). The first and second case bodies 31, 32 provide protection and anti-electromagnetic interference (EMI) effect to encase and shield multiple electronic components 4 on the circuit board 1, (such as image processor, LED indicator lamp or chip) so as to prevent the electronic components 4 from electromagnetic interference of outer side.

Each of the first and second case bodies 31, 32 has an inner side 311, 321 corresponding to the first and second mating sections 21, 22 of the lens assembly 2. A first connection section 33 is disposed on the inner side 311 of the first case body 31 and protrudes in a direction to the first mating section 21 of the lens assembly 2. A second connection section 34 is disposed on the inner side 321 of the second case body 32 and protrudes in a direction to the second mating section 22 of the lens assembly 2. The first and second connection sections 33, 34 respectively have a first leaf spring body 331 and a second leaf spring body 341. The first and second leaf spring bodies 331, 341 are, but not limited to, in a rectangular form. Alternatively, the first and second leaf spring bodies 331, 341 are pole-shaped or otherwise shaped. To speak more specifically, the first leaf spring body 331 has a first fixed end 3311 and a first elastic free end 3312.

The first fixed end 3311 is connected with the inner side 311 of the first case body 31. The first elastic free end 3312 downward obliquely extends from the first fixed end 3311 in a direction to the lens assembly 2.

Please further refer to FIGS. 1 and 2. The second leaf spring body 341 has a second fixed end 3411 and a second elastic free end 3412. The second fixed end 3411 is connected with the inner side 321 of the second case body 32. The second elastic free end 3412 downward obliquely extends from the second fixed end 3411 in a direction to the lens assembly 2.

The first and second elastic free ends 3312, 3412 are respectively engaged with the first and second step faces 2111, 2211 of the lens assembly 2 so as to restrict the lens assembly 2 from upward axially displacing (such as upward vertically displacing).

When assembled, the lens assembly 2 is downward pressed in a direction to the inner sides 311, 321 of the first and second case bodies 31, 32. The first and second elastic free ends 3312, 3412 of the first and second connection sections 33, 34 of the first and second case bodies 31, 32 are downward compressed by two sides of the base seat 23 of the lens assembly 2 and inward elastically deformed. Then, after the leg sections 231 of the base seat 23 are connected into the locating holes 13 of the circuit board 1, the first and second elastic free ends 3312, 3412 of the first and second connection sections 33, 34 are released from the compression of the two sides of the base seat 23. At this time, due to the elastic restoring force, the first and second elastic free ends 3312, 3412 outward elastically restore to their home positions to securely engage with the first and second step faces 2111, 2211 of the first and second notches 211, 221 of the base seat 23. Then the baking operation can be performed to the completely assembled camera device.

Therefore, in the present invention, the first and second connection sections 33, 34 of the first and second case bodies 31, 32 are connected with the first and second mating sections 21, 22 of the lens assembly 2 so as to securely fix the lens assembly 2 on the circuit board 1. In this case, under the requirement for thinning, the structural strength of the entire camera device can be still effectively enhanced. Moreover, the assembling process is facilitated and speeded and the cost is lowered. Accordingly, the problem of the conventional camera device that the circuit board 1 is apt to be damaged is solved.

The structure, connection relationship and effect of another embodiment of the camera device of the present invention are substantially identical to the structure, connection relationship and effect of the above embodiment of the camera device. In the other embodiment, the first and second leaf spring bodies 331, 341 of the first and second connection sections 33, 34 of the case assembly 3 and the first and second notches 211, 221 of the first and second mating sections 21, 22 of the lens assembly 2 are replaced with raised bodies disposed on the first and second connection sections 33, 34 of the case assembly 3 and channels disposed on the first and second mating sections 21, 22 of the lens assembly 2. That is, a first mating channel and a second mating channel are respectively disposed on the first and second mating sections 21, 22 of the two opposite sides of the base seat 23 of the lens assembly 2.

A first connection raised body and a second connection raised body are respectively disposed on the first and second connection sections 33, 34 of the case assembly 3. The first connection raised body is disposed on the inner side 311 of the first case body 31, while the second connection raised body is disposed on the inner side 321 of the second case body 32. The first and second connection raised bodies are correspondingly engaged with the first and second mating channels of the first and second mating sections 21, 22 so as to effectively enhance the structural strength. In this embodiment, the first and second mating channels are, but not limited to, in a substantially elongated rectangular form and the first and second connection raised bodies are, but not limited to, in a substantially elongated triangular form in adaptation to the elongated rectangular form of the first and second mating channels. In practice, alternatively, the first and second mating channels and the first and second connection raised bodies are in a substantially E-form, rectangular form, geometrical form (such as polygonal form or rhombic form) or irregular form (such as folded line form or arced line form) in adaptation to each other.

In still another embodiment, the first mating channel is in such as E-form and the first connection raised body is in such as E-form in adaptation to the first mating channel, while the second mating channel is in such as elongated rectangular form and the second connection raised body is in such as elongated angular form in adaptation to the second mating channel. Alternatively, the first and second mating channels are in such as E-form and the first and second connection raised bodies are in such as E-form in adaptation to the first and second mating channels. Accordingly, the first and second connection raised bodies and the first and second mating channels can be tightly engaged with each other.

In still another embodiment, multiple first connection raised body and multiple second connection raised body are respectively disposed on the first and second connection sections 33, 34 of the case assembly 3. The first and second connection raised bodies (in such as substantially rectangular form) are respectively disposed and arranged on the inner side 311 of the first case body 31 and the inner side 321 of the second case body 32 at intervals or in continuity with each other. Multiple first mating channels and multiple second mating channels are respectively disposed on the first and second mating sections 21, 22 of the lens assembly 2. The first and second mating channels (in such as substantially rectangular form) are disposed and arranged on the two opposite sides of the base seat 23 at intervals or in continuity with each other. The first and second connection raised bodies and the first and second mating channels are correspondingly engaged with each other to enhance the structural strength.

In still another embodiment, the raised bodies respectively disposed on the first and second connection sections 33, 34 of the case assembly 3 are replaced with channels, while the channels respectively disposed on the first and second mating sections 21, 22 of the lens assembly 2 are replaced with raised bodies. That is, at least one first connection channel and at least one second connection channel are respectively disposed on the first and second connection sections 33, 34 of the case assembly 3 and formed on the inner side 311 of the first case body 31 and the inner side 321 of the second case body 32. At least one first mating raised body and at least one second mating raised body are respectively disposed on the first and second mating sections 21, 22 of the lens assembly 2 and formed on the opposite sides of the base seat 23. The first and second mating raised bodies are respectively engaged with the first and second connection channels. The first and second connection channels and the first and second mating raised bodies are in a substantially E-form, rectangular form, geometrical form (such as polygonal form or rhombic form) or irregular form (such as folded line form or arced line form).

In the above embodiment, the first and second connection channels of the case assembly 3 are in an elongated form and respectively disposed on the inner side 311 of the first case body 31 and the inner side 321 of the second case body 32. The first and second mating raised bodies of the lens assembly 2 are in an elongated form and respectively disposed on the opposite sides of the base seat 23. However, in a modified embodiment, multiple first connection channels and multiple second connection channels are disposed and arranged on the inner side 311 of the first case body 31 and the inner side 321 of the second case body 32 at intervals or in continuity with each other. Multiple first mating raised bodies and multiple second mating raised bodies are disposed and arranged on the opposite sides of the base seat 23 at intervals or in continuity with each other. The first and second connection channels are correspondingly engaged with the first and second mating raised bodies.

Therefore, by means of the design of the above embodiments of the camera device connection structure of the present invention, the structural strength of the entire camera device can be enhanced in precondition that the structure is thinned. Moreover, the cost is lowered and the assembling steps are simplified (or reduced) so that the assembling process is speeded and facilitated to enhance production efficiency. In addition, in the present invention, the first and second mating sections 21, 22 of the lens assembly 2 are connected with the first and second connection sections 33, 34 of the case assembly 3. Such design is applicable to a camera device with narrowed bezel or thinned structure, (such as the camera device of a cellular phone, a notebook or a tablet or the camera device of other electronic product). Accordingly, the lens assembly 2 can be quickly assembled and located on the circuit board 1 with the circuit board 1 prevented from being bent or damaged. Therefore, the design of the present invention can effectively solve the problems of the conventional camera device that it is necessary to use a fixing jig to tightly press and securely locate the lens and it is necessary to apply the adhesive to the lens for adhering the lens to the printed circuit board 1 to cause damage of the printed circuit board 1 and increase of the cost.

The present invention has been described with the above embodiments thereof and it is understood that many changes and modifications in such as the form or layout pattern or practicing step of the above embodiments can be carried out without departing from the scope and the spirit of the invention that is intended to be limited only by the appended claims.

What is claimed is:

1. A camera device connection structure comprising:
a circuit board having an upper side and a lower side;
a lens assembly disposed on the upper side of the circuit board, two opposite sides of the lens assembly respectively having a first mating section and a second mating section; and
a case assembly having a first case body and a second case body, the first and second case bodies being disposed on the upper side of the circuit board and respectively positioned on two sides of the lens assembly, corresponding to the first mating section of the lens assembly, a second connection section being disposed on the inner side of the second case body corresponding to the second mating section of the lens assembly, the first and second connection sections being respectively connected with the first and second mating sections of the lens assembly, wherein the first and second connection sections respectively have a first leaf spring body and a second leaf spring body, the first leaf spring body having a first fixed end and a first elastic free end, the first fixed end being connected with the inner side of the first case body, the first elastic free end downward obliquely extending from the first fixed end in a direction to the lens assembly, the second leaf spring body having a second fixed end and a second elastic free end, the second fixed end being connected with the inner side of the second case body, the second elastic free end downward obliquely extending from the second fixed end in a direction to the lens assembly, whereby the structural strength of the camera device is enhanced in the condition that the structure of the camera device is thinned.

2. The camera device connection structure as claimed in claim 1, wherein the lens assembly has a lens and a base seat, the lens being disposed on a top side of the base seat and electrically connected with the circuit board, the first and second mating sections being respectively formed with a first notch and a second notch in stepped form, two opposite sides of the base seat being inward recessed to form the first and second notches, the first and second elastic free ends being correspondingly connected with the first and second notches.

3. The camera device connection structure as claimed in claim 2, wherein multiple leg sections are disposed under a bottom side of the base seat, multiple locating holes being formed on the circuit board corresponding to the leg sections, the leg sections being connected in the locating holes.

* * * * *